Figure 1:
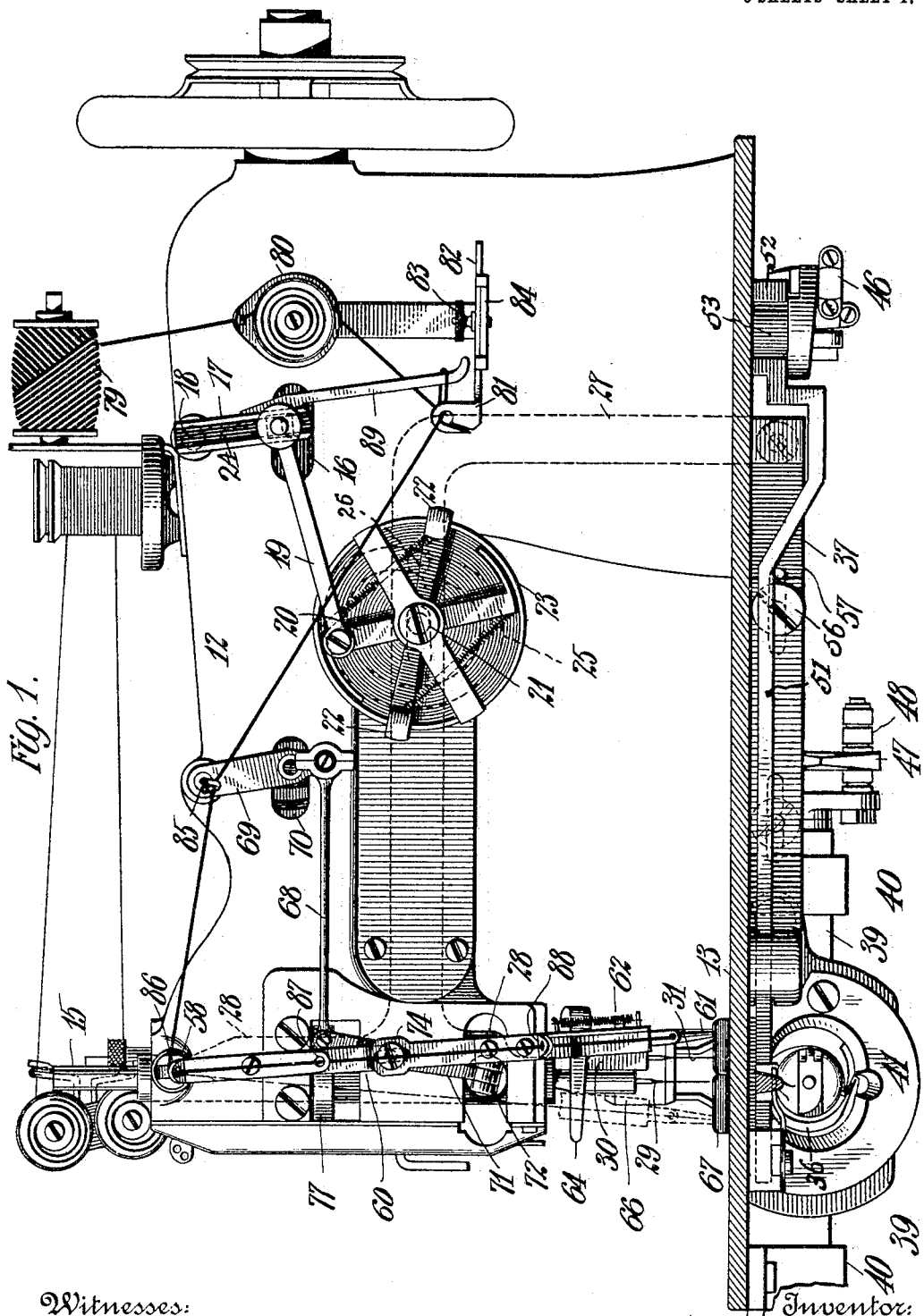

No. 781,673. PATENTED FEB. 7, 1905.
F. MUELLER.
EMBROIDERING MACHINE.
APPLICATION FILED MAR. 5, 1904.

5 SHEETS—SHEET 1.

Witnesses:
Frank S. Ober
C. M. Sweeney

Inventor:
Friedrich Mueller
By his Attorney

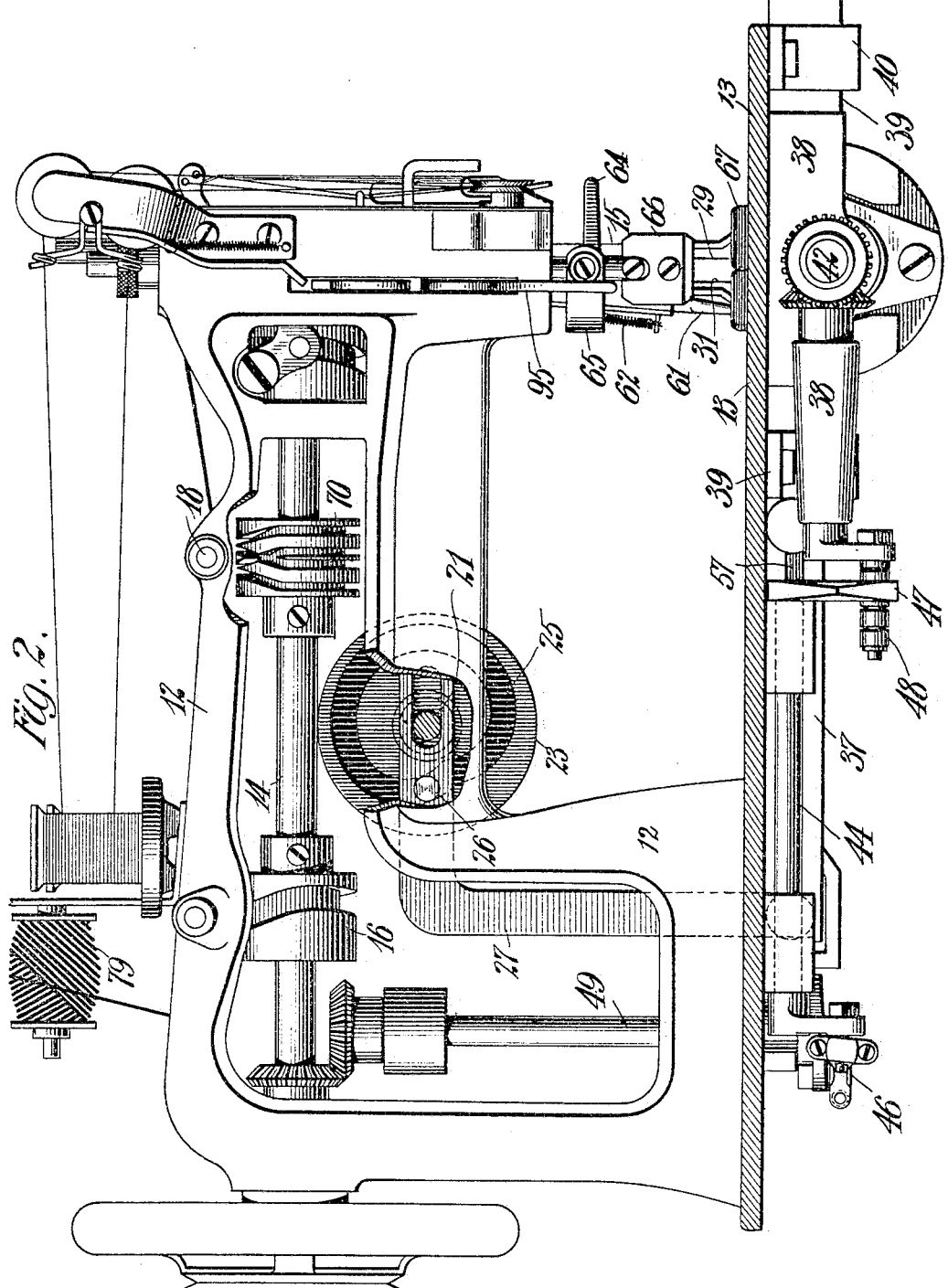

No. 781,673. PATENTED FEB. 7, 1905.
F. MUELLER.
EMBROIDERING MACHINE.
APPLICATION FILED MAR. 5, 1904.
5 SHEETS—SHEET 3.
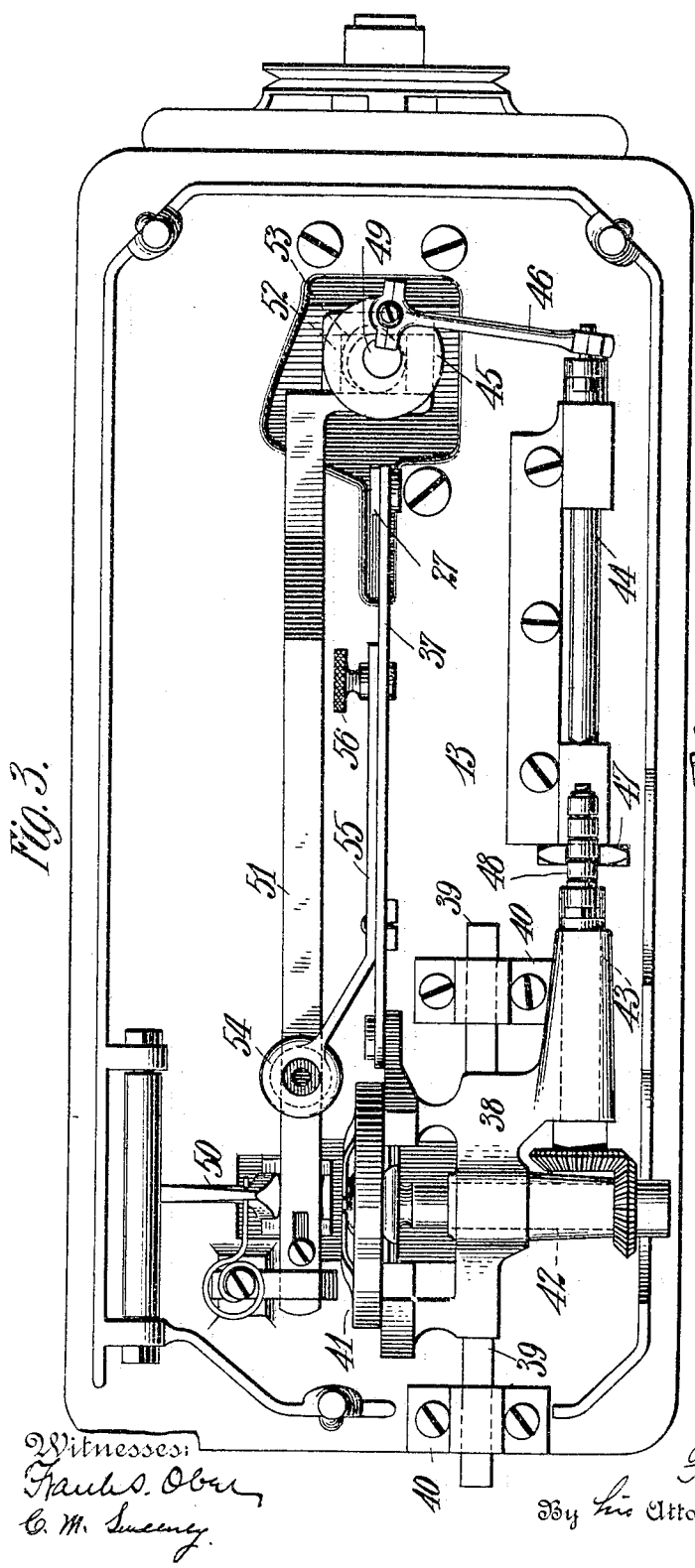
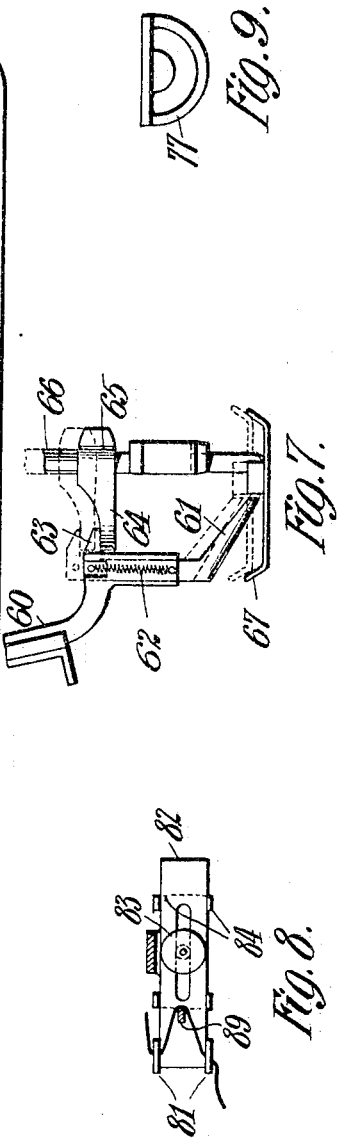
Witnesses:
Inventor:
Frederick Mueller
By his Attorney

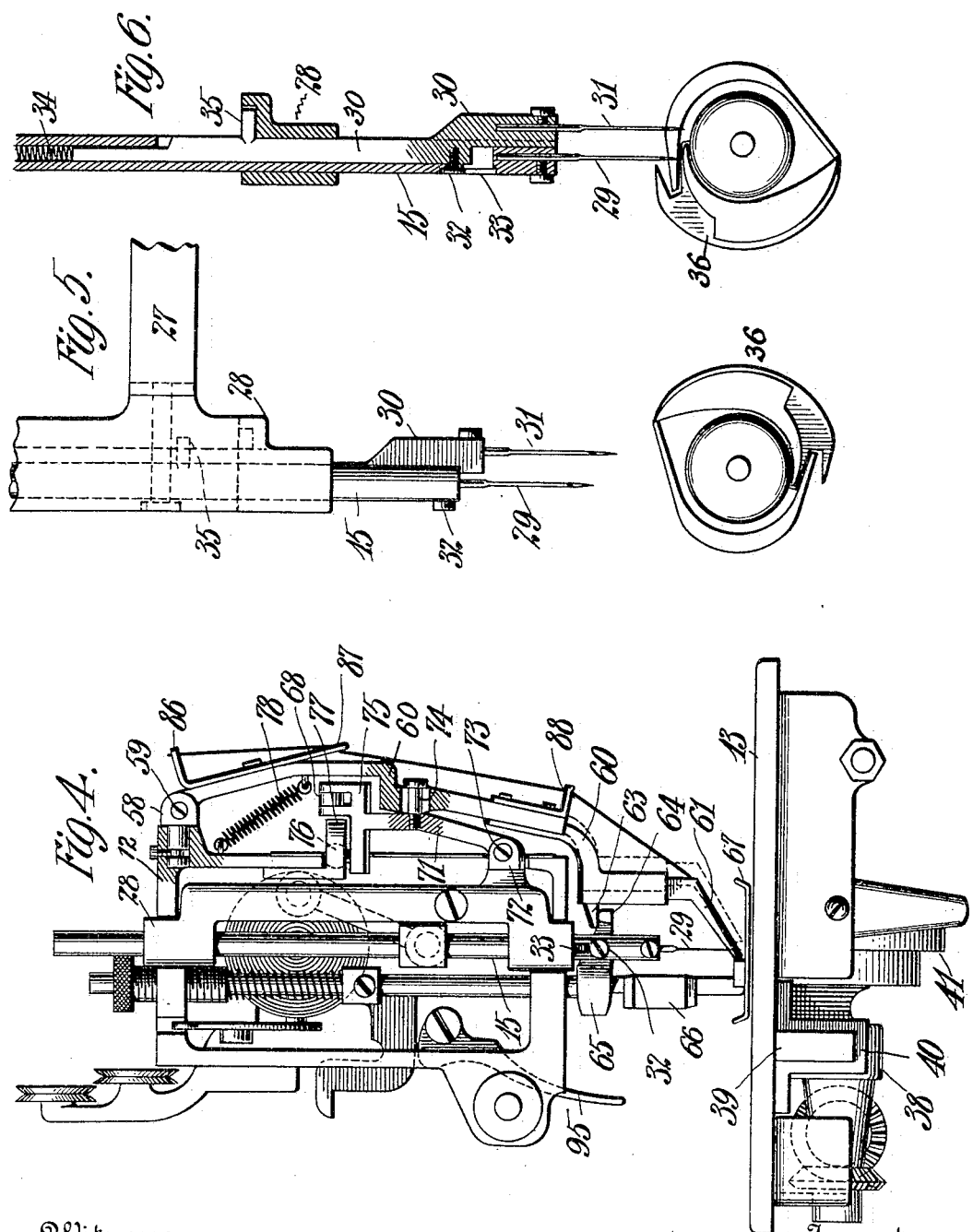

No. 781,673. PATENTED FEB. 7, 1905.
F. MUELLER.
EMBROIDERING MACHINE.
APPLICATION FILED MAR. 5, 1904.
5 SHEETS—SHEET 5.
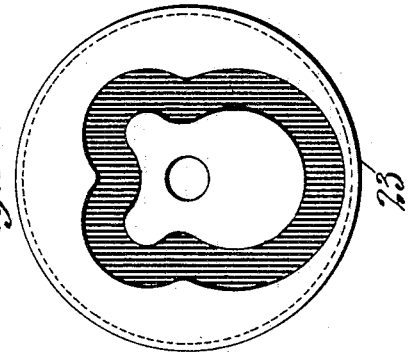
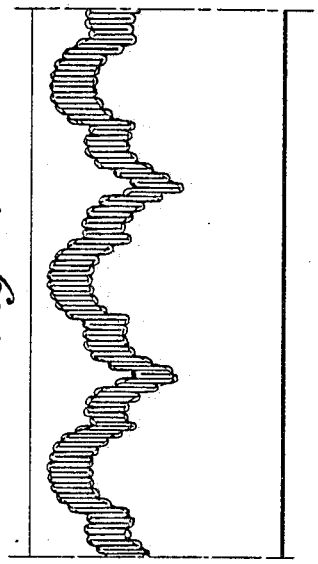
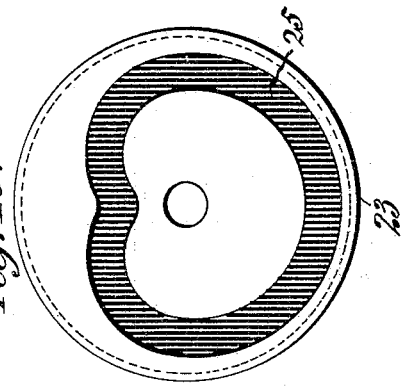
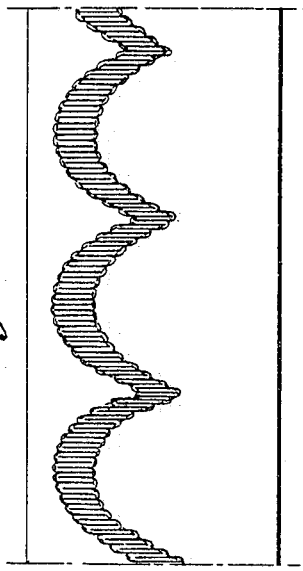

No. 781,673.                                                    Patented February 7, 1905.

UNITED STATES PATENT OFFICE.

FRIEDERICK MUELLER, OF NEWARK, NEW JERSEY, ASSIGNOR TO THE SINGER MANUFACTURING COMPANY, A CORPORATION OF NEW JERSEY.

EMBROIDERING-MACHINE.

SPECIFICATION forming part of Letters Patent No. 781,673, dated February 7, 1905.

Application filed March 5, 1904. Serial No. 196,667.

*To all whom it may concern:*

Be it known that I, FRIEDERICK MUELLER, a citizen of the United States, residing at Newark, in the county of Essex and State of New Jersey, have invented certain new and useful Improvements in Embroidering-Machines, of which the following is a specification, reference being had therein to the accompanying drawings.

This invention relates to a two-needle sewing-machine for fancy stitching and embroidering, and more particularly to that class of machines employing a vibrating thread-carrier which weaves an embroidery-thread back and forth between two rows of stitches, by which such embroidery-thread is secured to the face or upper side of the work in the production of ornamental figures.

In the preferred embodiment of the present invention the needle bar or bars are mounted for vertical reciprocation in a laterally-movable frame connected with an intermittingly-rotated cam, which moves the needles for a series of successive steps first in one direction and then in the other transverse to the feed of the work, and the shuttle or loop-taker beneath the work-plate is so connected with the needle-bar frame as to follow the transverse or lateral movements thereof, and thereby always maintain the proper operative relation between the needles and the shuttle or loop-taker. Also the vibrating embroidery thread-carrier is preferably connected with the laterally-movable needle-bar frame, so that its relation to the laterally-moving needles will always be properly maintained. Also in order to provide for a proper timing of the two needles relative to the shuttle or loop-taker to prevent "skipped stitches" one of the needles is attached to an auxiliary bar or carrier yieldingly mounted on the other or main needle-bar and governed by a stop which will arrest its descent before the needle carried by the said main needle-bar has quite completed its downward movement, and one needle will thus be caused to dwell or pause momentarily while the other needle, whose loop is first taken by the shuttle, completes its downward and commences its upward movement, so that the loops thrown out by both needles will be of the same size when taken by the shuttle or loop-taker and so that the loop of the needle last taken by the shuttle or loop-taker will not (as has sometimes been the case with machines employing two needles and one loop-taker) be so large as to render it liable to be shoved aside by the loop-taker, and thus endanger "skipping." Also in the improved machine the fulcrum of the feed-lever is preferably connected with the laterally-moving stitch-forming devices, so that the extent or amount of the feeding movements in making ornamental embroidery figures, as scallops, will be automatically varied during the production of each figure, being slightly less toward the points and slightly greater toward the middles of the scallops, so as to produce more perfect ornamental work.

In the accompanying drawings, Figures 1 and 2 are opposite side views of a machine embodying the present invention. Fig. 3 is a bottom view, and Fig. 4 a front end view, of the same. Figs. 5 and 6 are detail views of the shuttle and needle mechanisms. Fig. 7 is a detail view to show the vertically-yielding connection of the thread-carrier with its operating-lever. Fig. 8 is a detail view illustrative of the pull-off and take-up devices for the embroidery-thread. Fig. 9 is a detail plan view of the stationary cam controlling the movements of the embroidery-thread carrier. Figs. 10 and 12 illustrate the different forms of interchangeable cams which may be employed to produce different embroidery figures, such as are shown in Figs. 11 and 13, respectively.

Referring to the drawings, 12 denotes the bracket-arm, and 13 the work-plate, of the machine. Journaled in the upper part of the arm 12 is the main or needle-bar operating shaft 14, to the forward end of which the main needle-bar 15 is operatively connected by a pitman in the usual manner. The shaft 14 is provided with a grooved cam 16, entered by a stud at the lower end of a vibrating arm or lever 17, pivoted at 18 to the arm 13 and connected by a pitman 19 to a rocker 20, oscillating on a stud-screw 21, and with which rocker are connected spring-retracted clutch-dogs 22, engaging the flange of a camwheel 23 and imparting an intermittent rotary movement to said cam-wheel in a well-known manner. The arm or lever 17 is provided with a groove 24, in which a slide to which the pitman 19 is connected is adjustable toward and from the pivot of the said arm or lever, so as to vary the speed of rotation of the said cam-wheel 23, and thus vary the forms of the ornamental figures or scallops to be produced. The cam-wheel 23 has in its rear face a cam-groove 25, entered by a stud 26 on a right-angular arm 27, the horizontal part of which is connected at its forward end to the needle-bar frame 28, in which the main needle-bar 15, carrying the needle 29, reciprocates vertically. The intermittingly-rotating cam-wheel 23 will thus move the said needle-bar frame and the needles laterally or across the line of the feed of the work for a series of steps in succession, first in one direction and then in the other.

Mounted on the said main needle-bar 15 is a second or auxiliary needle-bar 30, carrying the needle 31. The said needle-bar 30 has a vertically yielding or sliding connection with the said main needle-bar 15 by virtue of a slot in the former to receive the latter and a spring 34, normally pressing the auxiliary needle-bar down against the bottom wall of said slot, but which spring will yield when a projection 35 on the bar 30 engages a suitable stop on the needle-bar frame 28. The needle 31 is normally set so that its eye is somewhat lower than the eye of the needle 29, and when in the descent of the needles the needle 31 has reached its desired lowest position the further descent thereof is arrested by contact of the projection 35 with a suitable stop or part on the needle-bar frame, and the spring 34 then yielding the main needle-bar 15 is free to descend farther independently of the needle-bar 30 until the eye of its needle 29 is on a level, or approximately so, with the eye of the needle 31. In its loop-taking movement the oscillating shuttle 36 moves from left to right, Fig. 6, and thus first takes the loop of the needle 29, which then commences its ascent as the shuttle moves forward, and the needle 31 then rises slightly and throws out a loop of thread of suitable size to be taken by the shuttle by the time the beak of the latter reaches the said needle. A loop of needle-thread of proper size to be taken by a shuttle or loop-taker of the form employed in the present machine is such a loop as is thrown out or formed by the ascent of about one-sixteenth of an inch of the needle from its lowest position, and by means of the yielding connection of the two needle-bars above described, and which permits of a movement of one independently of the other loops of an equal and proper size may be thrown out from two somewhat widely spaced needles to be entered by the point or beak of one and the same shuttle or loop-taker, and thus all danger of skipping stitches by reason of too small a loop from one needle or too large a loop from the other is entirely avoided, too large a loop, particularly with hard twisted or kinky thread, being liable to be pushed aside by the beak of the loop-taker instead of being properly entered thereby.

To provide for very considerable lateral movements of the stitch-forming devices across the line of the feed of the work, so as to produce deep scallops or other ornamental figures of considerable width, the shuttle of the present machine is moved laterally with the needles and is thus always kept in proper register therewith. To this end the right-angular arm 27, which is connected above the work-plate 13 to the needle-bar frame 28, has its vertical portion extended downward beneath the said work-plate, where it is joined by a bar 37 to a sliding shuttle-frame 38, having arms 39, entering supports 40, attached to the under side of the work-plate. The shuttle-race 41 is attached to the shuttle-frame 38, and the shuttle-operating rock-shaft 42 and its actuating rock-shaft 43, geared to the said shaft 42, are both journaled in said shuttle-frame, so as to partake of the lateral movements thereof. The primary shuttle-actuating rock-shaft 44 receiving motion from the rotating crank 45 through the pitman 46 is journaled in bearings stationary with the work-plate 13, said rock-shaft having at its forward end a slotted arm 47 embracing a long stud 48 on the rear arm of the rock-shaft 43, and which long stud permits of a very considerable endwise movement of the shaft 43 without breaking its connection with the arm 47 of the shaft. Through the series of rock-shafts referred to oscillating movements through an arc of considerably more than one hundred and eighty degrees are imparted to the oscillating shuttle, as is necessary in this class of machines. The crank 45 is attached to the lower end of the vertical shaft 49, geared to the main shaft 14.

In the formation of ornamental scallops it is desirable that the forward feed of the work should be lessened slightly toward the ends or points of the scallops and increased somewhat toward the middle portions thereof, so that the said ends or points will be well covered by the woven-in embroidery thread or cord. In the present invention the feed-bar 50 is operated in a well-known manner by a vibrating and longitudinally-reciprocating feed-lever 51, having at its rear end a yoke 52, embracing a feed-cam 53 on the vertical shaft 19. The fulcrum 54, on which the said feed-lever vibrates, is carried by a bar 55, fixedly attached by a set-screw 56 to the bar 37, which connects the arm 27 with the movable shuttle-frame, so that as the needles and shuttle are moved laterally or across the line of feed in stitching scallops the said fulcrum will be automatically shifted therewith, thus automatically varying the feed, so as to lessen it toward the ends or points of the scallops and increasing it toward the middles thereof for the purpose above indicated. The feed may be manually adjusted in the usual manner by loosening the set-screw 56 and shifting it in the slot 57 in the bar 37, thus moving the bar 55 and the fulcrum 54 of the feed-lever toward or from the feed-bar 50.

Mounted in the forward portion of the bracket-arm 12 is a swivel-stud 58, to which is pivoted by a screw 59 a lever 60, attached to the lower end of which is the embroidery-thread carrier 61, which swings back and forth in front of the needles. The shank of the said thread-carrier is mounted to slide vertically in the lever 60 and is normally retained in its lowest position, with the lower end of the said thread-carrier closely adjacent to the work, as is desirable, by a spring 62, the said shank being, however, provided with a horizontal projection 63, extending above an arm 64, having a shank 65 attached to the presser-bar 66, so that when said presser-bar is raised to lift the presser-foot 67 for the insertion or removal of the work by any suitable lifting device, as lever 95, the thread-carrier will also be lifted out of the way, but will be restored to its normal or working position by the said spring 62 when the presser-foot is lowered so as to rest on the work.

The thread-carrier lever 60 is operated by a pitman 68 from a swinging arm or lever 69, pivoted at its upper end to the bracket-arm 12 and provided with a switch-stud which engages a cross-grooved cam 70 on the main shaft 14, so that the said lever will be reciprocated once to each two rotations of said shaft, and thus carry the embroidery-thread in one direction across the path of the feed of the work in front of the needles at one reciprocation of the latter and in the opposite direction at the next reciprocation of the said needles.

In order that the embroidery-thread may be laid close against the needles, the lower end of the thread-carrier is caused to move in a horizontally-curved path, so that at each end of its throw, where it pauses while the needles are descending, the said lower or forward end of the said thread-carrier will be slightly behind the needles. It is also necessary or at least desirable that the working position of the said thread-carrier should follow the working positions of the needles as the latter are shifted laterally in the production of ornamental figures. To these ends the thread-carrier lever 60 is connected by a lever 71 with a swivel-stud 72, attached to the needle-bar frame 28, and to which stud the said lever 71 is jointed by a screw 73, and the said levers 71 and 60 are jointed together by a screw 74. The forward end of the pitman 68 is attached to a fork on a horizontal arm 75 at the upper end of the lever 71, and the said arm is provided with a pin or roller-stud 76, entering a curved slot in a stationary cam 77, attached to the forward end of the bracket-arm 12. The roller-stud 76 may fit somewhat loosely in the slot of the stationary cam 77, and in such case the operation of said cam and roller-stud in effecting the in-and-out movements of the lever 60 as it swings back and forth to move the thread-carrier across the line of the feed of the work will preferably be assisted by a spring 78, connected with the arm 12 and with the said lever 60.

The embroidery thread or cord runs from the spool 79 through a tension device 80 through twin thread guides or eyes 81 on a plate 82, adjustably secured by a set-screw 83 to a plate or support 84, fixed to the arm 12, and thence through thread eyes or guides 85, 86, 87, and 88 to the thread-carrier 61. The thread-guides 85 and 86 register as nearly as possible with the pivotal points of the levers 69 and 60, respectively, so as to be practically stationary relative to the thread-supply. The embroidery-thread is engaged between the twin thread-guides 81 by a pull-off and take-up arm 89, attached to the lever or arm 17, and which arm 89 serves to draw up or tighten the bights of embroidery-thread interwoven with the needle-threads, said arm also serving at each stitch to draw from the spool 79 a new supply of embroidery-thread. This take-up action of the arm 89 is possible by virtue of the fact that after leaving the tension device 80 the embroidery-thread runs freely to the thread-carrier 61 and that the said arm 89 acts on said thread between the tension device and the said thread-carrier. The pull-off effect may be varied to accommodate differently-spaced needles by adjusting the plate 82 endwise of the machine on its support 84, so as to increase or diminish the effective operation of the arm 89, a rearward adjustment of the said plate 82, so as to render more or less of the movement of the said arm 89 idle, diminishing the pull-off effect, as will be understood.

Various forms of ornamental or embroidery figures may be produced by means of the mechanism hereinbefore described. Thus by providing the cam-wheel 23 with a cam-groove of the configuration shown in Fig. 10 plain scallops, such as are shown in Fig. 11, may be produced, while by the use of a cam-groove such as is shown in Fig. 12 irregular scallops, such as are shown in Fig. 13 may be made. These figures or scallops may be further varied by adjustment of the feed of the work or by varying the speed of rotation of the cam-wheel 23, as hereinbefore described, or by both, and thus by virtue of the adjustments referred to and by providing interchangeable cam-wheels 23, having different forms of cam-grooves, a great variety of ornamental figures may be made on the improved machine. If it be desired to form straight-ahead seams, which may be either plain (by omitting thread from the thread-carrier 61) or ornamental, the connection of the pitman 19 with the arm or lever 17 may be adjusted so as to register with the pivotal point 18 of said arm or lever.

The shifting-shuttle or loop-taking mechanism to keep the shuttles or loop-takers at all times in register with the needles, as well as the differential movements of the needles, enables the production of figures of greater lateral amplitude, as also with more widely-spaced needles coöperating with a single shuttle or loop-taker, than was possible with previous machines constructed for similar ornamental work.

The invention is not to be understood as being limited to the details of construction herein shown and described, as these may be varied widely without departing from the essence of the invention.

Having thus described my invention, I claim and desire to secure by Letters Patent—

1. In a sewing-machine, the combination with a stitch-forming mechanism comprising a plurality of needles and a single loop-taking device coöperating therewith, of means for simultaneously shifting the said needles and loop-taker, for a series of steps in succession in each direction, across the line of the feed of the work, a thread-carrier for laying an embroidering-thread across the lines of stitches made by said stitch-forming mechanism, a feeding mechanism, and means for automatically varying the feed so as to alternately lessen and increase its extent for a series of stitches in succession.

2. In a sewing-machine adapted for stitching ornamental scallops, the combination with a stitch-forming mechanism, and automatic means for changing the relative lateral positions of the stitch-forming devices and the work for a series of steps in succession in each direction, of a thread-carrier for laying an embroidering-thread across the lines of stitching, a feeding mechanism, and means for automatically varying the feed so as to slowly lessen its extent toward the ends or points of the scallops and slowly increase its extent toward the middles thereof.

3. In a sewing-machine, the combination with two needles and a single loop-taker coöperating therewith, of main and auxiliary needle-bars by which said needles are carried, said auxiliary needle-bar being mounted to slide vertically independently of the said main needle-bar, and means for arresting the downward movement of said auxiliary needle-bar before the downward movement of the main needle-bar has been completed and for restoring the said auxiliary needle-bar to its normal position relative to the said main needle-bar after the latter has commenced its upward movement.

4. In a sewing-machine, the combination with two needles and a single loop-taker coöperating therewith, of main and auxiliary needle-bars by which said needles are carried, said auxiliary needle-bar being mounted to slide vertically independently of the said main needle-bar, means for arresting the downward movement of said auxiliary needle-bar before the downward movement of the main needle-bar has been completed and for restoring the said auxiliary needle-bar to its normal position relative to the said main needle-bar after the latter has commenced its upward movement, a thread-carrier for laying an embroidering-thread across the lines of stitches formed by said needles, and means for operating said thread-carrier.

5. In a sewing-machine, the combination with a stitch-forming mechanism comprising a needle-bar frame and means for shifting said needle-bar frame laterally to change the working position of the needle or needles, of a thread-carrier for laying an embroidering-thread across the stitches made by said stitch-forming mechanism, and which thread-carrier is connected with said needle-bar frame so that its working position is automatically changed to preserve its proper operative relation to the needle or needles as said needle or needles are moved laterally.

6. In a sewing-machine, the combination with a stitch-forming mechanism comprising a plurality of needles and a single loop-taking device coöperating therewith, of a horizontally-movable needle-bar frame, a horizontally-movable frame in which the said loop-taking device is mounted, an intermittingly-rotating cam connected with the needle-bar and loop-taker frames, and serving to impart simultaneous shifting movements to said frames, for a series of steps in succession in each direction, in a plane transverse to the line of the feed of the work, a feeding mechanism, and means for automatically varying the feed so as to alternately lessen and increase its extent for a series of stitches in succession.

7. In a sewing-machine, the combination with a stitch-forming mechanism, of a thread-carrier lever, a thread-carrier the lower end of which is normally closely adjacent to the work-plate and which thread-carrier has a vertically-yielding connection with said lever, a presser-bar, a presser-foot, and means connected with said presser-bar and thread-carrier whereby the latter will be lifted with the presser-foot when the said presser-bar is raised.

8. In a sewing-machine, the combination with a stitch-forming mechanism comprising a laterally-movable needle-bar frame, a needle bar or bars reciprocating vertically therein, and a loop-taking device coöperating with the needle or needles carried by said bar or bars, a thread-carrier for laying an embroidering-thread across the stitches made by said stitch-forming mechanism, a lever at the lower end of which said thread-carrier is mounted, and which lever is fulcrumed to the machine-frame, an operating-lever which is fulcrumed to the said needle-bar frame and connected with the thread-carrier lever, so that the working position of the latter will be caused to follow the lateral movements of the said needle-bar frame, and means for actuating said operating-lever and for imparting lateral movements to said needle-bar frame.

9. In a sewing-machine, the combination with a stitch-forming mechanism comprising a laterally-movable needle-bar frame, a needle bar or bars reciprocating vertically therein, and a loop-taking device coöperating with the needle or needles carried by said bar or bars, a thread-carrier for laying an embroidering-thread across the stitches made by said stitch-forming mechanism, a lever at the lower end of which said thread-carrier is mounted, and which lever is fulcrumed to the machine-frame, an operating-lever which is fulcrumed to the said needle-bar frame and connected with the thread-carrier, so that the working position of the latter will be caused to follow the lateral movements of the said needle-bar frame, and means for actuating said operating-lever and for imparting lateral movements to said needle-bar frame, said means comprising an intermittingly-rotating cam constructed to impart to said needle-bar frame a series of steps in succession, in each direction, across the line of the feed of the work.

10. In a sewing-machine, the combination with a stitch-forming mechanism comprising two needles and a loop-taking device coöperating with the said needles, of a bar or carrier for each of said needles, means for operating said bars or carriers, and means for maintaining one bar or carrier temporarily stationary at the lower end of its stroke while the other bar or carrier completes its downward movement and commences its upward movement.

In testimony whereof I affix my signature in presence of two witnesses.

FRIEDERICK MUELLER.

Witnesses:
　HENRY J. MILLER,
　HENRY A. KORNEMANN.